US012789741B2

(12) United States Patent
Santin Navarro

(10) Patent No.: US 12,789,741 B2
(45) Date of Patent: Nov. 10, 2026

(54) SIDE AIRBAG FOR VEHICLE SAFETY SYSTEM OF AN AUTOMOTIVE VEHICLE AND VEHICLE SAFETY SYSTEM

(71) Applicant: DALPHI METAL ESPANA S.A., Vigo (ES)

(72) Inventor: Pedro Jose Santin Navarro, Vigo (ES)

(73) Assignee: DALPHI METAL ESPANA S.A., Vigo (ES)

(*) Notice: Subject to any disclaimer, the term of this patent is extended or adjusted under 35 U.S.C. 154(b) by 0 days.

(21) Appl. No.: 18/746,697

(22) Filed: Jun. 18, 2024

(65) Prior Publication Data

US 2025/0010811 A1 Jan. 9, 2025

Related U.S. Application Data

(63) Continuation of application No. 17/288,651, filed as application No. PCT/EP2019/081847 on Nov. 19, 2019, now Pat. No. 12,043,199.

(51) Int. Cl.

| | |
|---|---|
| ***B60R 21/231*** | (2011.01) |
| ***B60R 21/232*** | (2011.01) |
| ***B60R 21/2334*** | (2011.01) |

(52) U.S. Cl.
CPC ...... *B60R 21/23138* (2013.01); *B60R 21/232* (2013.01); *B60R 21/2334* (2013.01)

(58) Field of Classification Search
CPC ............ B60R 21/213; B60R 21/23138; B60R 21/232; B60R 21/233; B60R 21/2334; B60R 2021/0034; B60R 2021/161; B60R 2021/23308; B60R 2021/23316; B60R 2021/23324
See application file for complete search history.

(56) References Cited

U.S. PATENT DOCUMENTS

| | | | |
|---|---|---|---|
| 12,043,199 B2 * | 7/2024 | Santín | B60R 21/23138 |
| 2025/0263038 A1 * | 8/2025 | Ohno | B60R 21/23138 |

* cited by examiner

*Primary Examiner* — Laura Freedman
(74) *Attorney, Agent, or Firm* — Tarolli, Sundheim, Covell & Tummino LLP

(57) ABSTRACT

The disclosure relates to a side airbag for a vehicle safety system of an automotive vehicle including an autonomously driving vehicle. The side airbag comprises at least one inflatable area and at least one non-inflatable area which subdivides the inflatable area and forms at least one adaptive deployment portion which, regarding its deployment shape, automatically and adaptively adapts to the position of an assigned vehicle seat. Further, a vehicle safety system is also disclosed.

20 Claims, 2 Drawing Sheets

SIDE AIRBAG FOR VEHICLE SAFETY SYSTEM OF AN AUTOMOTIVE VEHICLE AND VEHICLE SAFETY SYSTEM

CROSS-REFERENCE TO RELATED APPLICATIONS

This application is a continuation of U.S. application Ser. No. 17/288,651 filed on Apr. 26, 2021, which is a national stage of International Application No. PCT/EP2019/081847, filed Nov. 19, 2019, the disclosures of which are incorporated herein by reference in their entirety, and which claims priority to German Patent Application No. 102018128987.1, filed Nov. 19, 2018, the disclosure of each which is hereby incorporated herein by reference in their entirety.

TECHNICAL FIELD

The present disclosure relates to a side airbag for a vehicle safety system of an automotive vehicle and to a vehicle safety system.

BACKGROUND

In conventional automotive vehicles a side airbag, especially a curtain side airbag, may be provided to laterally support a vehicle occupant by the side airbag inflating if needed so that the vehicle occupant is protected in the event of crash. Known side airbags are adapted to an upright standard position of a backrest that is typically provided during traveling, as the vehicle driver has to sit in a substantially upright position to be able to drive the automotive vehicle.

However, especially in the case of autonomously driving vehicles, a driver may adopt a sitting position during driving which is not covered by the existing vehicle safety systems, especially by the present airbags. For example, in autonomously driving vehicles, during driving a driver may be in a reclined position which is not provided in a conventional vehicle. When a driver is sitting in such a position, i.e. the reclined sitting position, in which the backrest is arranged in a backwardly reclined position, the prior art side airbags can only partially cover the driver.

Thus, there is a need for a side airbag for a vehicle safety system as well as a vehicle safety system by means of which an extension of a traditional upright sitting position may still be afforded protection by the side airbag.

SUMMARY

In one exemplary arrangement, a side airbag for a vehicle safety system of an automotive vehicle, which may be a vehicle driving autonomously at least temporarily or partly, is disclosed. The side airbag comprises at least one inflatable area and at least one non-inflatable area which subdivides the inflatable area and forms at least one adaptive deployment portion configured to adapt, regarding its deployment shape, automatically and adaptively to the position of an assigned vehicle seat.

The term deployment shape refers to a deployment volume, and in one exemplary arrangement, a shape of the side airbag in the inflated state.

Since the adaptive deployment portion of the side airbag adapts to the position of an assigned vehicle seat, for example, to the position of the backrest of the vehicle seat, side airbag protection for sitting positions beyond the conventional standard sitting position may be covered. The adaptive deployment portion thus includes a dynamic deployment portion. On one hand, the advantage of the side airbag being capable of deploying in a standard position in a desired manner without the protective effect of the deployment of the area of the side airbag being impeded by the backrest of the assigned vehicle seat during deployment is achieved. In this case, only the adaptive deployment portion supports against the vehicle seat without obstructing deployment of the main area of the side airbag. On the other hand, in the case of a reclined position, the adaptive deployment portion can deploy in a desired manner, as the backrest does not block deployment of the adaptive deployment portion in this position.

The non-inflatable area may be completely or almost completely surrounded (in the inflated state) in one plane by the inflatable area. This helps to obtain subdivision of the inflatable area into different subareas by the non-inflatable area. In this way, the deployment shape can be easily adapted to the position of the assigned vehicle seat.

In one exemplary arrangement, the adaptive deployment portion may be a subarea of the inflatable area which is fluidically cut, at least partially, off a main area of the inflatable area. In other words, the side airbag has an inflatable area which inflates as needed, with the inflatable area being subdivided into different subareas, viz. a main area adopting a defined position (constantly and, resp., irrespective of the position of the vehicle seat) and the adaptive deployment portion which appropriately adapts to the position of the vehicle seat. By at least partially fluidically separating the adaptive deployment portion from the main area, the position of the adaptive deployment portion in the inflated state of the side airbag may appropriately vary depending on the sitting position of a vehicle occupant.

The adaptive deployment portion may be in fluid communication with the main area via at least one flow passage. In this way, gas generated by an inflator for inflating the side airbag may flow from the main area into the adaptive deployment portion. Thus, only one inflator is required to inflate the main area and the deployment portion, which renders a vehicle safety system including the side airbag especially cost-efficient.

According to one embodiment, the adaptive deployment portion is in fluid communication with the main area via two flow passages, especially wherein at least one of the flow passages is adjacent to a lower longitudinal edge of the side airbag. In this way, the adaptive deployment portion can be inflated especially quickly in case of need and, resp., desired deployment of the side airbag can be attained, for example a desired direction of deployment. Since the adaptive deployment portion is connected to the main area via more than one flow passage, the adaptive deployment portion is moreover kept to be movable in one plane, i.e. the deployment portion is prevented from twisting. By the fact that at least one flow passage is adjacent to a lower longitudinal edge of the side airbag, the adaptive deployment portion is supported to be especially stable, as a lower edge of the adaptive deployment portion directly merges into the main area via the flow passage.

The non-inflatable area is formed and/or limited e.g. by at least one cutout in the side airbag and/or by at least one dart in the side airbag. This offers the advantage that the non-inflatable area can be easily formed by the devices present anyway for the manufacture of the side airbag.

In one exemplary configuration of the side airbag, the non-inflatable area is substantially completely covered on both sides by a patch, wherein preferably the patches extend in the longitudinal vehicle direction on both sides beyond the non-inflatable area and wherein, further preferred, the patches extend almost along the entire length of the side airbag. This ensures that also the non-inflatable areas have a protective effect.

The non-inflatable area may comprise (in the inflated state) at least two linear portions extending at an obtuse angle relative to each other, wherein a first portion extends in parallel to a longitudinal vehicle axis and a second portion connected to the first portion extends starting from the first portion to a lower longitudinal edge of the side airbag, especially wherein the second portion widens at least in an area adjacent to the lower longitudinal edge of the airbag toward the longitudinal edge. The two portions may be merging into each other. Alternatively, or in addition, the non-inflatable area may have a curved C-shaped portion. The lower longitudinal edge refers to a mounted and inflated state of the side airbag within the automotive vehicle.

As at least part of the non-inflatable subarea may extend in a longitudinal vehicle direction. The adaptive deployment portion is configured to move in the mounted and inflated state of the side airbag along a vertical vehicle direction, namely downwards. The adaptive deployment portion thus may appropriately adapt its height on the basis of the non-inflatable subarea. Thus, by the adaptive deployment portion, a restraining force can be exerted on a vehicle occupant, especially on the head of a vehicle occupant, even if the vehicle occupant is in a leaned-back position or a reclined position.

In one exemplary arrangement, the non-inflatable area comprises another curved portion which is completely surrounded by the inflatable area at least in one plane (in the inflated state). The curved portion enables the adaptive deployment portion to be movable along a longitudinal vehicle direction, thus allowing the adaptive deployment portion to align even better with respect to a position of a vehicle occupant, i.e. the assigned vehicle seat, for example when a vehicle occupant adopts a sitting position at a relatively large distance from the steering wheel. This refers to a position at which a distance of a vehicle occupant from the steering wheel is larger than this would be the case in a non-autonomous or conventional driving manner.

The portions of the non-inflatable area delimit the adaptive deployment portion. In one exemplary arrangement, at least on a side face of the side airbag, a patch is disposed that covers the non-inflatable area at least partly, almost completely or completely. The patch is disposed on a side face of the side airbag facing the vehicle occupant. In this way, a restraining effect and a rollover performance of the side airbag are improved. According to a further exemplary embodiment, on a patch may be disposed on both sides of the side airbag, thus causing the performance of the side airbag to be additionally improved.

According to another exemplary embodiment, the side airbag is a curtain side airbag which is arranged to be installed in the area of a roof rail of the vehicle. A curtain side airbag helps to properly protect a vehicle occupant even in the case of side impact. In this way, a vehicle occupant is especially prevented from hitting a side structure or a window of the vehicle.

The side airbag may comprise, when viewed in a cross-section, at least three substantially separately formed inflation chambers which are juxtaposed along the longitudinal vehicle axis, the central inflation chamber being assigned to the adaptive deployment portion. Thus, an especially large side area of the vehicle, especially the complete vehicle side, may be covered by the side airbag. The central inflation chamber is assigned to the various head positions of the vehicle occupant which the vehicle occupant may adopt when travelling in the autonomously driving automotive vehicle.

In a further exemplary arrangement, a vehicle safety system is disclosed which comprises an adjustable vehicle seat and an assigned side airbag in any of the afore-described forms, wherein the side airbag is configured and disposed in the vehicle so that the side airbag can be deployed into an inflated state without bearing against a backrest of an assigned vehicle seat being in a reclined position.

In addition, the adaptive deployment portion of the side airbag can be inflated free from obstruction.

The side airbag is may be configured and disposed relative to the vehicle seat so that, in the inflated state, it may support against a backrest of the vehicle seat provided in the standard position, the main area (22) of the side airbag (10) being inflatable free from obstruction despite the bearing thereof.

Accordingly, bearing takes place especially by a lower end of the side airbag which extends substantially in parallel to the longitudinal vehicle axis.

Depending on the position of the vehicle seat, a bearing point of the side airbag may be different in the inflated state of the side airbag, as the bearing point depends on the vehicle seat and thus on the position thereof. Due to the different position of the bearing point, the shape of the side airbag in the inflated state, especially the position of the adaptive deployment portion, may be adapted to the position of the vehicle seat and thus may be optimally adjusted to a sitting position of a vehicle occupant.

The adaptive deployment portion deploys in the direction of the bearing point until the adaptive deployment portion hits the same. In other words, the bearing point delimits the deployment of the adaptive deployment portion.

In one exemplary arrangement, a vehicle safety system is disclosed that comprises an adjustable vehicle seat and an assigned side airbag which may be configured as afore-described, the side airbag being configured and disposed relative to the vehicle seat so that a bearing point of the side airbag in the inflated state thereof contacts the backrest of the vehicle seat.

Preferably, in this way a flow passage formed in the area of a lower longitudinal edge of the side airbag is at least partially closed.

In one exemplary embodiment of the vehicle safety system, patches are disposed in the inflated state of the side airbag above a backrest of an assigned vehicle seat. The patches may extend in the longitudinal vehicle direction on both sides beyond the non-inflatable area of the side airbag.

According to one embodiment, a position of the subarea relative to the main area of the side airbag in the inflated state is adapted to a sitting position of a vehicle occupant. Since the subarea primarily serves for supporting the head of a vehicle occupant, the head of the vehicle occupant is optimally supported in all possible sitting positions.

BRIEF DESCRIPTION OF THE DRAWINGS

Further advantages and features of the disclosure will be evident from the following description and from the drawings which will be referred to, wherein.

DETAILED DESCRIPTION

Figure 1:
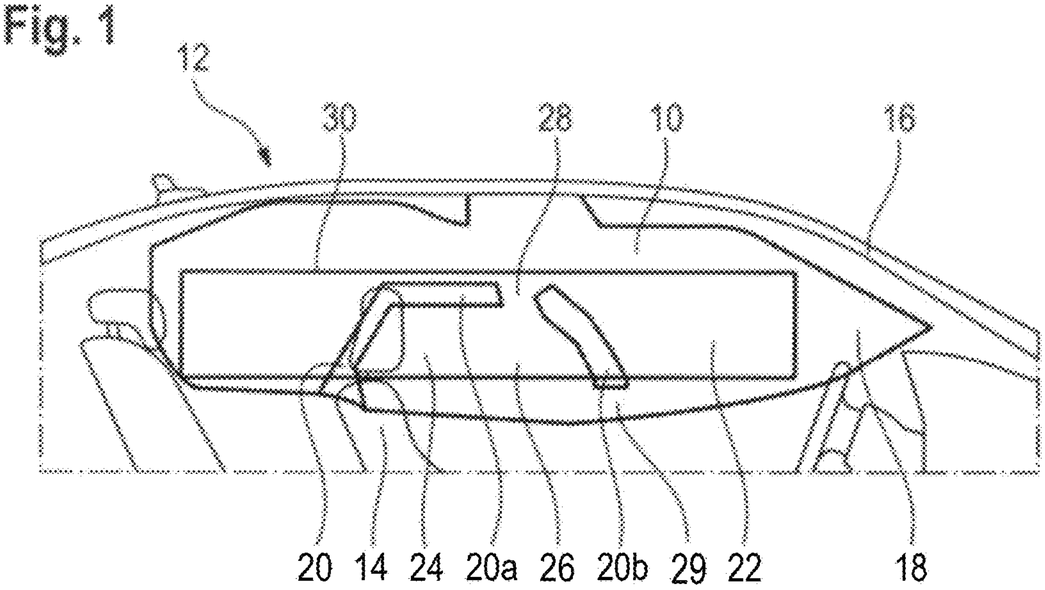
FIG. 1 schematically shows a vehicle safety system according to an exemplary arrangement and including a side airbag in a deployed state.

FIG. 1 schematically illustrates a side airbag 10 according to an exemplary arrangement which is part of a vehicle safety system 12 comprising the side airbag 10 and an adjustable vehicle seat 14.

The side airbag 10 is designed especially for use in autonomously driving automotive vehicles. In the shown example configurations, the side airbag 10 is in the form of a curtain side airbag.

In FIG. 1, the side airbag 10 is illustrated in a mounted state in an automotive vehicle 16, the side airbag 10 being shown in a deployed state for the purpose of better illustration. During normal driving operation, the side airbag 10 is disposed in a folded state in the area of a roof rail of the vehicle 16. As needed, the side airbag 10 is inflated, for example by means of an inflator.

The side airbag 10 comprises an inflatable area 18 and a non-inflatable area 20, the non-inflatable area 20 subdividing the inflatable area 18 into a main area 22 and a subarea 24.

The non-inflatable area 20 is formed, for example, by at least one cutout or by at least one dart in the side airbag 10.

Due to the non-inflatable area 20, in the inflated state of the side airbag 10 a certain mobility of the subarea 24 is possible relative to the main area 22, especially in the longitudinal vehicle direction and in the vertical vehicle direction.

In the shown example configuration, the non-inflatable area 20 is divided into a first non-inflatable area 20*a* and a second non-inflatable area 20*b*.

The first non-inflatable area 20*a* comprises two linear portions extending at an obtuse angle relative to each other, with a first portion extending substantially in parallel to a longitudinal vehicle axis of the vehicle 16 and a second portion connected to the first portion extending from the first portion to a lower longitudinal edge of the side airbag 10. The second portion widens at least in an area adjacent to the lower longitudinal edge of the side airbag 10 towards the longitudinal edge.

In the shown embodiment, the second non-inflatable area 20*b*, on the other hand, comprises a curved portion which is surrounded at least in one plane, especially in a lateral plane of the vehicle, completely by the inflatable area 18, as is also clearly evident from FIG. 1.

The two non-inflatable areas 20*a*, 20*b* delimit the subarea 24 of the inflatable area 18 at least partially against the main area 22, as is clear from FIG. 1, thus the subarea 24 being approximately autonomous from the main area 22 and thus being capable of deploying largely independently of the main area 22.

The subarea 24 thus represents an adaptive deployment portion 26 which is capable, as regards its deployment shape, of adapting independently and adaptively to the position of the assigned vehicle seat 14, especially largely independently of the main area 22. In this manner, the position of the adaptive deployment portion 26 can be aligned especially properly to a head position of a vehicle occupant, as shall be illustrated in detail hereinafter in connection with FIGS. 3 and 4.

The adaptive deployment portion 26 and, resp., the subarea 24 is fluidically cut, as least partly, off the main area 22, especially by the non-inflatable area 20, as illustrated before.

However, the adaptive deployment portion 26 in the shown embodiment is in fluid communication with the main area 22 via two flow passages 28, 29 so that during inflation of the main area 22 also the adaptive deployment portion 26 is inflated. The flow passages 28, 29 moreover ensure a certain positional stability of the adaptive deployment portion 26 and prevent the adaptive deployment portion 26 from twisting during inflation of the side airbag 10.

In the shown embodiment, the first flow passage 28 extends between the two non-inflatable areas 20*a*, 20*b* and the second flow passage 29 extends between the second non-inflatable area 20*b* and a longitudinal edge of the side airbag 10.

The non-inflatable area 20 is substantially completely covered, preferably on both sides but at least on one side (especially on the side facing a vehicle occupant, viz. the side facing away from the lateral inner vehicle wall), by a patch 30, with the patch(es) 30 extending in the longitudinal vehicle direction on one/both side(s) beyond the non-inflatable area 20. The patch(es) 30 extend(s) almost along the entire length of the side airbag 10. The patch(es) 30 help(s) to improve a restraining effect and a rollover performance of the side airbag 10.

Figure 2:
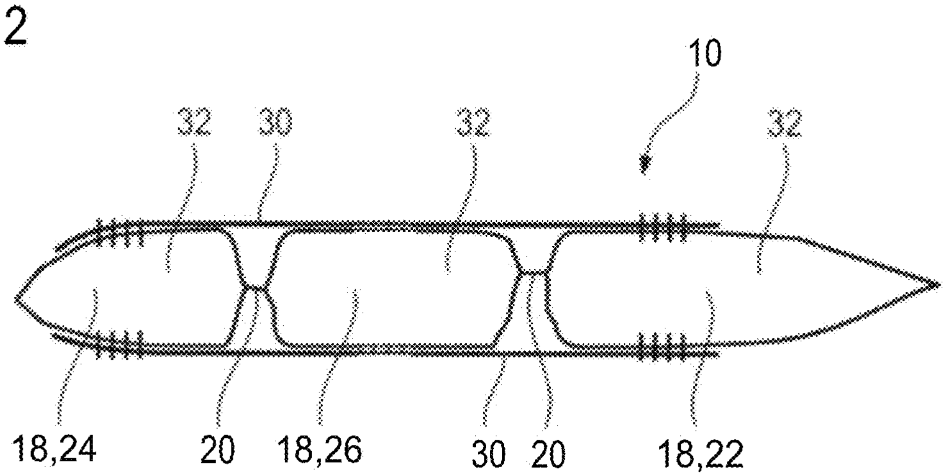
FIG. 2 shows a section across the side airbag according an exemplary arrangement in the deployed state, FIG. 3 schematically shows the vehicle safety system according to an exemplary arrangement in a deployed state of the side airbag, with the vehicle seat being provided in a first position, and FIG. 4 schematically shows the vehicle safety system according to an exemplary arrangement in a deployed state of the side airbag, with the vehicle seat being provided in a second position.

FIG. 2 illustrates a section across the side airbag 10 according to an exemplary arrangement in the area of the adaptive deployment portion 26.

In this sectional view, the patches 30 arranged on both sides are clearly shown. It is also evident that the side airbag 10 comprises three substantially separately configured inflation chambers 32 which are juxtaposed along the longitudinal vehicle axis, wherein the central inflation chamber 32 is assigned to the adaptive deployment portion 26 and, resp., forms the adaptive deployment portion 26. The central inflation chamber 32 is movable to a limited extent in the longitudinal vehicle direction.

The functioning of the side airbag 10 according to the exemplary arrangement shown and the vehicle safety system 12 according to an exemplary arrangement, shall be illustrated in detail hereinafter by way of FIGS. 3 and 4.

Figure 3:
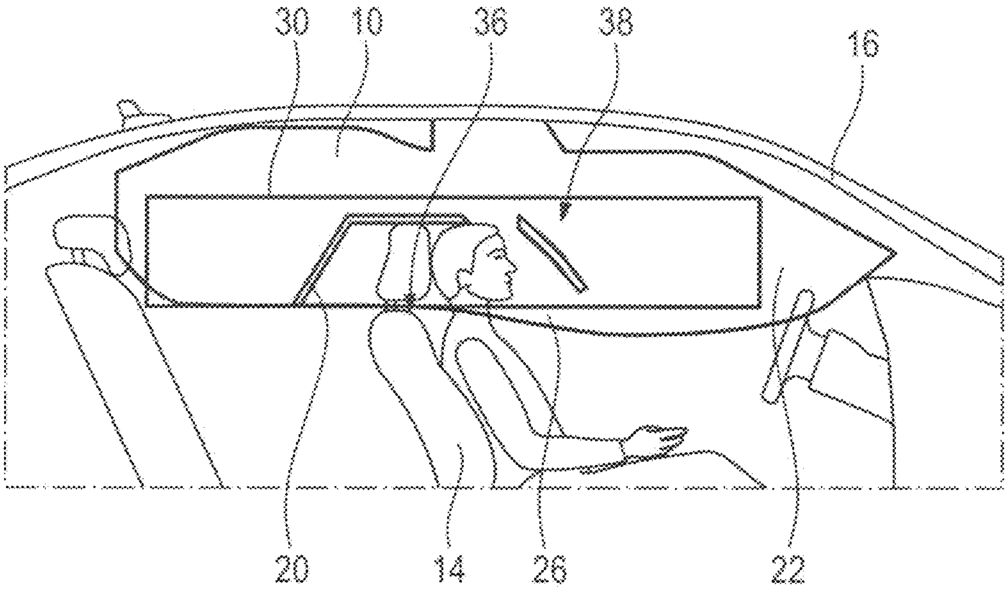

FIG. 3 shows an embodiment of the vehicle safety system 12 in a state in which the side airbag 10 is inflated, with the vehicle seat 14 being provided in a first position, viz. in a position in which the driver can drive the vehicle him-/herself. In FIG. 4, on the other hand, the vehicle seat 14 is provided in a second position in which the driver sits at a larger distance from the steering wheel and only autonomous driving is possible, for example in a reclined position.

Figure 4:
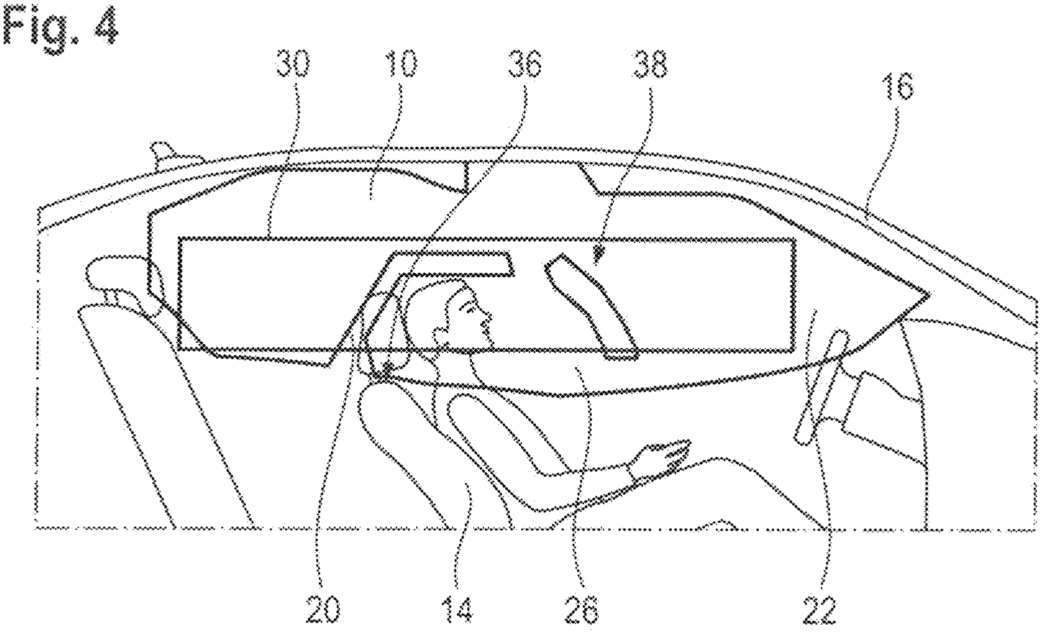

As is evident from FIGS. 3 and 4, the side airbag 10, especially one end of the side airbag 10 extending in parallel to the longitudinal vehicle axis, bears on the vehicle seat 14.

More specifically, in the embodiment shown the adaptive deployment portion 26, especially an end of the deployment portion 26 assigned to the vehicle seat 14, bears on the vehicle seat 14.

Depending on the position of the vehicle seat 14, a bearing point 36 of the side airbag 10, especially of the adaptive deployment portion 26, is different.

The term "bearing point" does not necessarily mean one single point, also a supporting or bearing surface of the side airbag 10 on the vehicle seat 14 may be understood to be a bearing point 36.

Due to the fact that the bearing point 36 is different depending on the position of the vehicle seat 14, the position of the adaptive deployment portion 26 may appropriately vary so that in case of need a vehicle occupant is optimally supported in each sitting position.

This is especially due to the fact that the adaptive deployment portion 26 in the case of release is deploying in the direction of the vehicle seat 14 until it hits the bearing point 36.

Considering FIGS. 3 and 4, it is evident that in FIG. 3 the bearing point 36 marked by a cross for better illustration is arranged further upwards in the vertical vehicle direction and further forward in the longitudinal vehicle direction than in the sitting position shown in FIG. 4 which corresponds to a reclined position. Accordingly, also the position of the head of the vehicle occupant in FIG. 3 is provided further upwards and further forward than in the sitting position shown in FIG. 4.

In the scenario illustrated in FIG. 3, the adaptive deployment portion 26 is arranged in a first position after inflation of the side airbag 10. The non-inflatable area 20 in this state is compressed by the inflatable area 18, i.e. the main area 22 and the adaptive deployment portion 26, as is clearly evident when comparing the two FIGS. 3 and 4. In this way, the adaptive deployment portion 26 may adopt a position located relatively near the top corresponding to the position of the vehicle seat 14.

In FIG. 4, the non-inflatable area 20 is compressed less strongly (or even not at all), as the bearing point 36 and consequently also the adaptive deployment portion 26 come to be located further downwards in the vertical vehicle direction and further backwards in the longitudinal vehicle direction than in the position of the vehicle seat 14 shown in FIG. 3. In other words, the side airbag 10, especially the adaptive deployment portion 26, in the vertical vehicle direction can deploy further downwards in the direction of the vehicle seat 14. This is due, in part, to the fact that the bearing point 36 is located at a respectively lower point as compared to the situation shown in FIG. 3.

Thus, a position of the subarea 24, especially of the adaptive deployment portion 26, relative to the main area 22 in the inflated state of the side airbag 10 is adapted to a sitting position of the vehicle occupant which is defined by the position of the vehicle seat 14.

As is evident from FIGS. 3 and 4, the main area 22 of the side airbag 10 deploys substantially similarly irrespective of the sitting position and, resp., the position of the vehicle seat 14. Consequently, the adaptive adaptation of the side airbag 10, especially of the adaptive deployment portion 26, is effectuated via the non-inflatable area 20.

In FIGS. 3 and 4, in addition a contour indicates an area 38 in which the head of a vehicle occupant may come to lie taking all possible positions of the vehicle seat 14 into account. This area can be reliably covered as needed by the side airbag 10 according to an arrangement of the disclosure comprising the adaptive deployment portion 26.

What is claimed is:

1. A side airbag of a vehicle safety system, the side airbag helping to protect an occupant of a vehicle seat of a vehicle configured for driving autonomously at least partially or temporarily, the side airbag comprising an inflatable area and at least one non-inflatable area configured to subdivide the inflatable area into a main area and an adaptive deployment portion, wherein the adaptive deployment portion comprises a bearing point configured to engage the vehicle seat when the airbag is deployed, wherein the at least one non-inflatable area is configured to be compressed between the adaptive deployment portion and the main area in response to the bearing point of the adaptive deployment portion engaging a backrest of the vehicle seat, which allows the adaptive deployment portion to move relative to the main area.

2. The side airbag according to claim 1, wherein the at least one non-inflatable area is configured to be compressed at least one of vertically and longitudinally between the main area and the adaptive deployment portion.

3. The side airbag according to claim 1, wherein the at least one non-inflatable area comprises a first portion that is configured to extend, at least in part, longitudinally along the side airbag above the adaptive deployment portion, wherein the first portion of the at least one non-inflatable area is configured to be compressed vertically in response to the bearing point of the adaptive deployment portion engaging the backrest of the vehicle seat, which allows the adaptive deployment portion to move vertically relative to the main area.

4. The side airbag according to claim 1, wherein the at least one non-inflatable area comprises a second portion that is configured to extend, at least in part, vertically along the side airbag to the rear of the adaptive deployment portion, wherein the second portion of the at least one non-inflatable area is configured to be compressed longitudinally in response to the bearing point of the adaptive deployment portion engaging the backrest of the vehicle seat, which allows the adaptive deployment portion to move longitudinally relative to the main area.

5. The side airbag according to claim 1, wherein the side airbag is configured so that bearing point of the adaptive deployment portion varies with a degree to which the vehicle seat is reclined.

6. The side airbag according to claim 5, wherein the side airbag is configured so that a degree to which the adaptive deployment portion moves relative to the main area depends on the degree to which the vehicle seat is reclined.

7. The side airbag according to claim 1, wherein the at least one non-inflatable area has a width measured along its surface between the main area and the adaptive deployment portion, the at least one non-inflatable area being configured to compress along its width in response to the bearing point of the adaptive deployment portion engaging the backrest of the vehicle seat.

8. The side airbag according to claim 1, wherein the side airbag is configured and disposed such that the side airbag can be deployed into an inflated state without the bearing point of the adaptive deployment portion engaging the backrest of the vehicle seat when the seat is reclined to a predetermined degree.

9. The side airbag according to claim 1, wherein the side airbag is configured and disposed such that the at least one non-inflatable area forms a flow passage in an area of a lower longitudinal edge of the side airbag, and wherein the flow passage is configured to be at least partly closable in response to the bearing point of the adaptive deployment portion contacting the backrest of the vehicle seat.

10. The side airbag according to claim 9, wherein the at least one non-inflatable area is configured to form an additional flow passage between the main area and the adaptive deployment portion at an upper end portion of the adaptive deployment portion.

11. The side airbag according to claim 1, wherein the at least one non-inflatable area is formed by one or more cutouts in the side airbag and/or by one or more darts in the side airbag.

12. The side airbag according to claim 1, wherein the non-inflatable area is covered substantially completely on both sides of the side airbag by patches, wherein each patch extends in a longitudinal vehicle direction beyond the non-inflatable area and along a substantial portion of an entire length of the side airbag.

13. The side airbag according to claim 1, wherein the at least one non-inflatable area comprises a first non-inflatable area comprising a first portion configured to extend longitudinally along the side airbag above the adaptive deployment portion, and a second portion configured to extend at an obtuse angle relative to the first portion rearward of the adaptive deployment portion.

14. The side airbag according to claim 13, wherein the at least one non-inflatable area comprises a second non-inflatable area having a curved configuration, the second non-inflatable area being spaced from the first non-inflatable area and configured to extend along a forward extent of the adaptive deployment portion.

15. The side airbag according to claim 14, wherein the side airbag comprises a first flow passage fluidly connecting the main area to the adaptive deployment portion, the first flow passage being defined between a terminal end of the first portion of the first non-inflatable area and an upper end of the second non-inflatable area.

16. The side airbag according to claim 15, wherein the side airbag comprises a second flow passage fluidly connecting the main area to the adaptive deployment portion, the second flow passage being defined between a lower end of the second non-inflatable area and a lower edge of the side airbag.

17. The side airbag according to claim 1, wherein the side airbag is a curtain side airbag which is arranged to be installed in an area of a roof rail of the vehicle.

18. The side airbag according to claim 1, wherein when viewed in cross-section, the side airbag comprises at least three substantially separately configured inflation chambers which are juxtaposed along a longitudinal vehicle axis, the adaptive deployment portion being a central one of the inflation chambers.

19. A vehicle safety system comprising the side airbag according to claim 1.

20. The side airbag according to claim 1, wherein compression of the non-inflatable area reduces a cross-sectional flow area of at least one flow passage between the main area and the adaptive deployment portion.

* * * * *